(12) United States Patent
Alexander

(10) Patent No.: US 7,713,019 B2
(45) Date of Patent: May 11, 2010

(54) FLAT-BED TRUCK WITH CRANE, LIFT OR HOIST

(76) Inventor: Larry Alexander, 8750 Pendleton Pike, Indianapolis, IN (US) 46226

( * ) Notice: Subject to any disclaimer, the term of this patent is extended or adjusted under 35 U.S.C. 154(b) by 413 days.

(21) Appl. No.: 11/820,267

(22) Filed: Jun. 20, 2007

(65) Prior Publication Data
US 2008/0317579 A1 Dec. 25, 2008

(51) Int. Cl.
*B60P 1/48* (2006.01)
(52) U.S. Cl. .................. 414/812; 414/546; 212/180; 212/261
(58) Field of Classification Search ............ 212/258, 212/261, 180, 294; 414/541, 542, 546, 470, 414/486, 487, 812
See application file for complete search history.

(56) References Cited

U.S. PATENT DOCUMENTS

| | | | | | |
|---|---|---|---|---|---|
| 2,639,825 | A | * | 5/1953 | Eakin | 414/546 |
| 2,689,053 | A | * | 9/1954 | Olson | 414/546 |
| 2,747,754 | A | * | 5/1956 | Harrison | 414/541 |
| 2,925,922 | A | * | 2/1960 | Frenzel | 212/258 |
| 2,951,601 | A | * | 9/1960 | Castoe | 414/563 |
| 3,095,099 | A | * | 6/1963 | Costello | 414/542 |
| 3,820,673 | A | * | 6/1974 | McVaugh | 414/546 |
| 4,721,431 | A | * | 1/1988 | Ostermeyer | 414/542 |
| 5,368,436 | A | * | 11/1994 | Freiburger | 414/810 |
| 6,799,935 | B1 | * | 10/2004 | Grollitsch | 414/546 |
| 7,189,048 | B2 | * | 3/2007 | Rinderknecht | 414/546 |
| 2002/0076313 | A1 | * | 6/2002 | Vartanian, Sr. | 414/546 |

FOREIGN PATENT DOCUMENTS

WO WO 89/06611 * 7/1989

* cited by examiner

*Primary Examiner*—James Keenan
(74) *Attorney, Agent, or Firm*—Daniel O'Connor

(57) ABSTRACT

A flat-bed truck system and method for efficiently delivering and unloading items using special crane, lift or hoist elements. The cranes are foldable downward into a horizontal position. Lower plural and parallel drive elements are used to drive upper pivoting arms which are connected by a cross-bar element. The cranes are designed with a low center of gravity so they may be positioned at various points around the bed of the truck. The lower plural drive elements are fixed in a horizontal position by brackets which may be easily applied and removed.

1 Claim, 7 Drawing Sheets

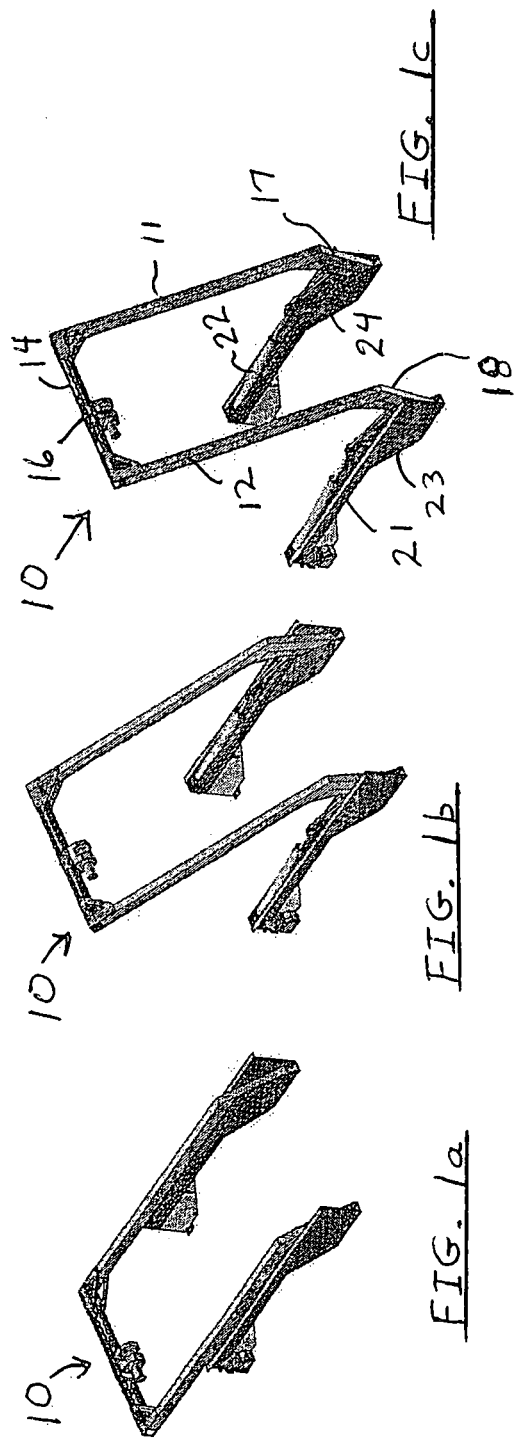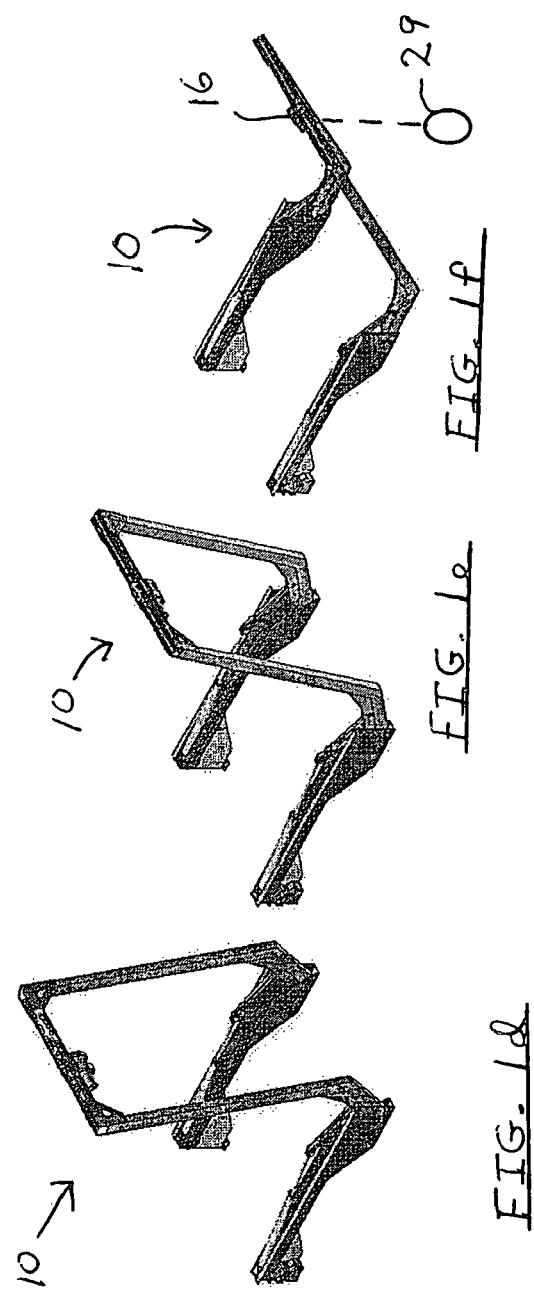

FLAT-BED TRUCK WITH CRANE, LIFT OR HOIST

BACKGROUND AND OBJECTS OF THE INVENTION

The present invention is generally related to the trucking, shipping and product delivery arts and, in particular, to a crane, lift or hoist unit which is specially designed for use with trucks of a flat-bed type.

As shown in the prior art drawing of FIG. 2, truck cranes used on flat-bed delivery trucks typically use a single base with upper pivot and boom elements.

Such truck crane systems are subject to tipping problems and typically require a crew of workmen to load and unload products for delivery.

Accordingly, it is an object of the present invention to demonstrate a crane, lift or hoist unit which may be efficiently utilized in a flat bed truck delivery system and method of use.

As a part of the shipping and business method of use, the special crane or lift may be placed at various points on the flat-bed truck.

It is a further object of the invention to set forth a crane or lift having lower dual drive elements and upper pivoting arms and a cross-arm or cross-bar member to provide maximum lifting capacity and increased stability during the load transferring process.

It is also an object to show a crane or lift which may be easily attached to the bed of a flat-bed truck by means of bracket elements which facilitate rapid installation and/or removal of the lift as needed in a product delivery process.

It is a further object to teach a business method of use in which various products may be delivered at a lower operating cost to provide increased benefits for consumers.

These and other objects and advantages of the invention will be apparent to those of skill in the product delivery and loading/unloading arts.

PRIOR ART PATENTS AND DESIGNS

During the course of preparing this specification for submission to the U.S. Patent and Trademark Office, a full search of the prior art related to cranes, lifts and truck crane units was conducted.

U.S. Pat. No. 5,281,078 issued to Mills in 1994 shows a portable hoist having a single hydraulic drive unit in combination with a pair of braces and a boom and winch element.

U.S. Pat. No. 5,848,715 issued to Duncan in 1998 teaches the use of a combined roll bar and crane having hydraulic boom actuation.

The claims and description included in this specification are set forth in order to clearly define over the above prior art and any related teachings in the truck crane field.

SUMMARY OF THE INVENTION

A flat-bed truck system incorporates a specially designed crane, lift or hoist unit in order to more efficiently and economically deliver a wide range of products, The crane or lift includes lower dual drive elements to maximize lifting capability and stsbility for the product being unloaded.

The crane, lift or hoist is mounted to the flat-bed truck via brackets in such a manner that it may be easily moved to various locations on the truck. Such facilitates delivery to a number of different types of locations, i.e. rear unloading at a factory docking port or side unloading at a roadside delivery area.

As a part of the method and business method, multiple cranes may be utilized on a single flat-bed truck and the crane may be mounted flush with the truck bed to enable forklift trucks to easily pass thereover.

BRIEF DESCRIPTION OF THE DRAWING FIGURES

FIGS. 1a-1f show a crane, lift or hoist in various operating positions from a stored fully horizontal position to fully extended.

Figure 6:
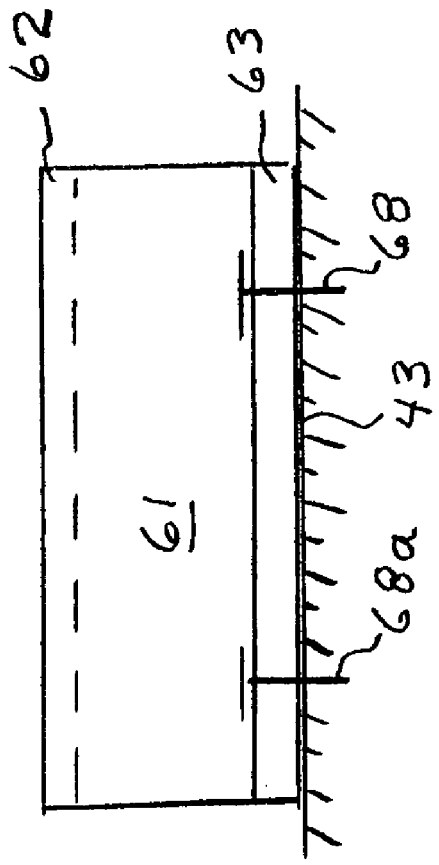
Figure 5:
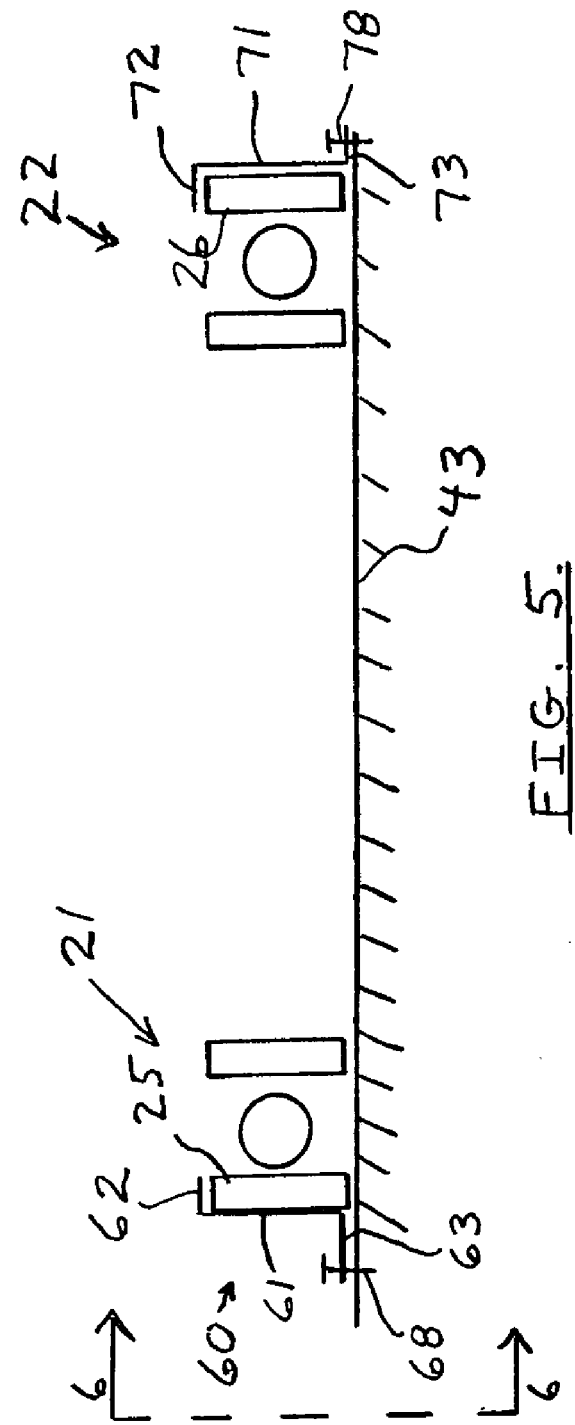

FIGS. 5 and 6 respectively show schematic sectional and side views of brackets used with the invention.

Figure 7:
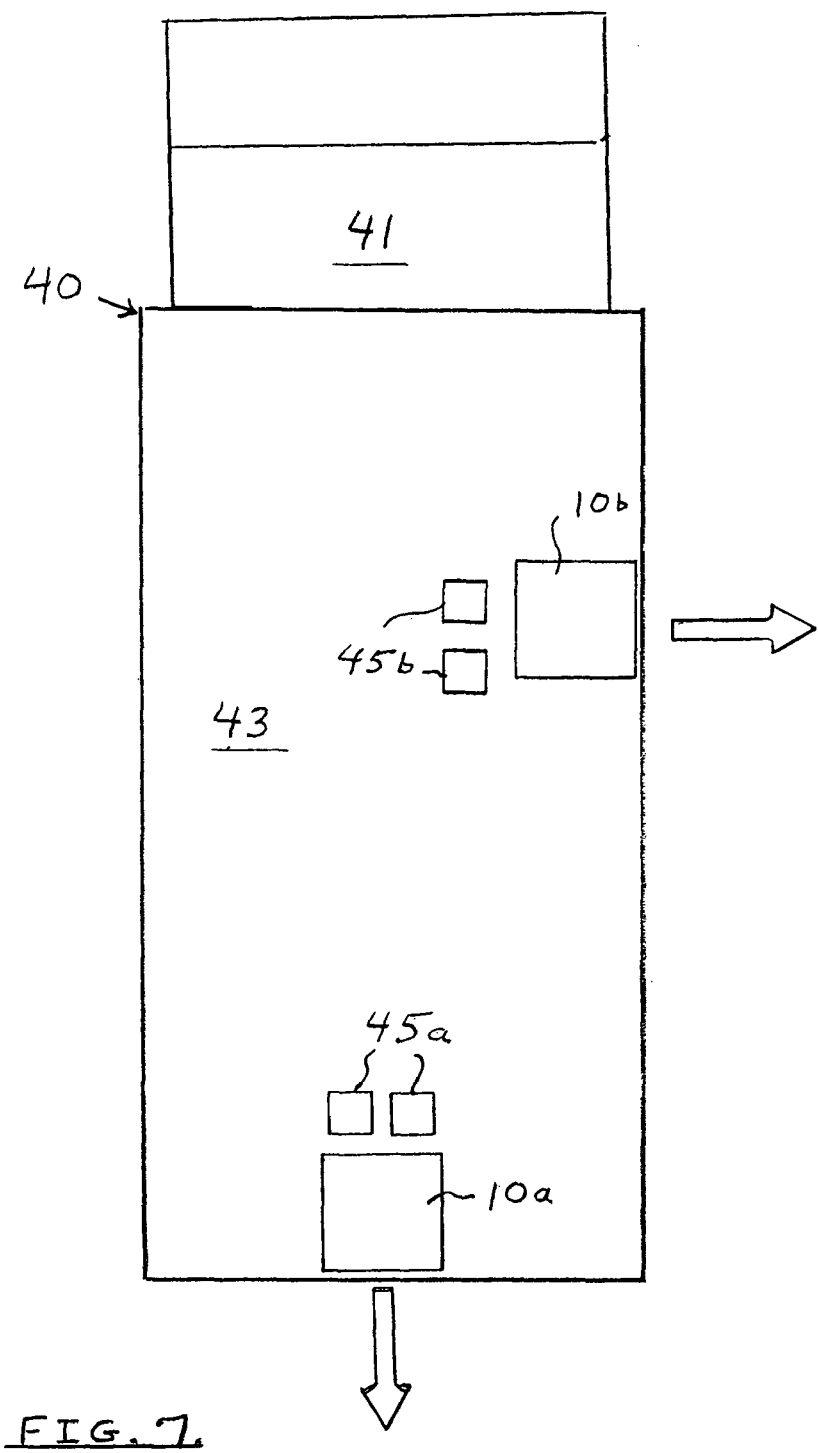

FIG. 7 illustrates a method of using plural cranes in the unloading process of a flat-bed truck.

Figure 8:
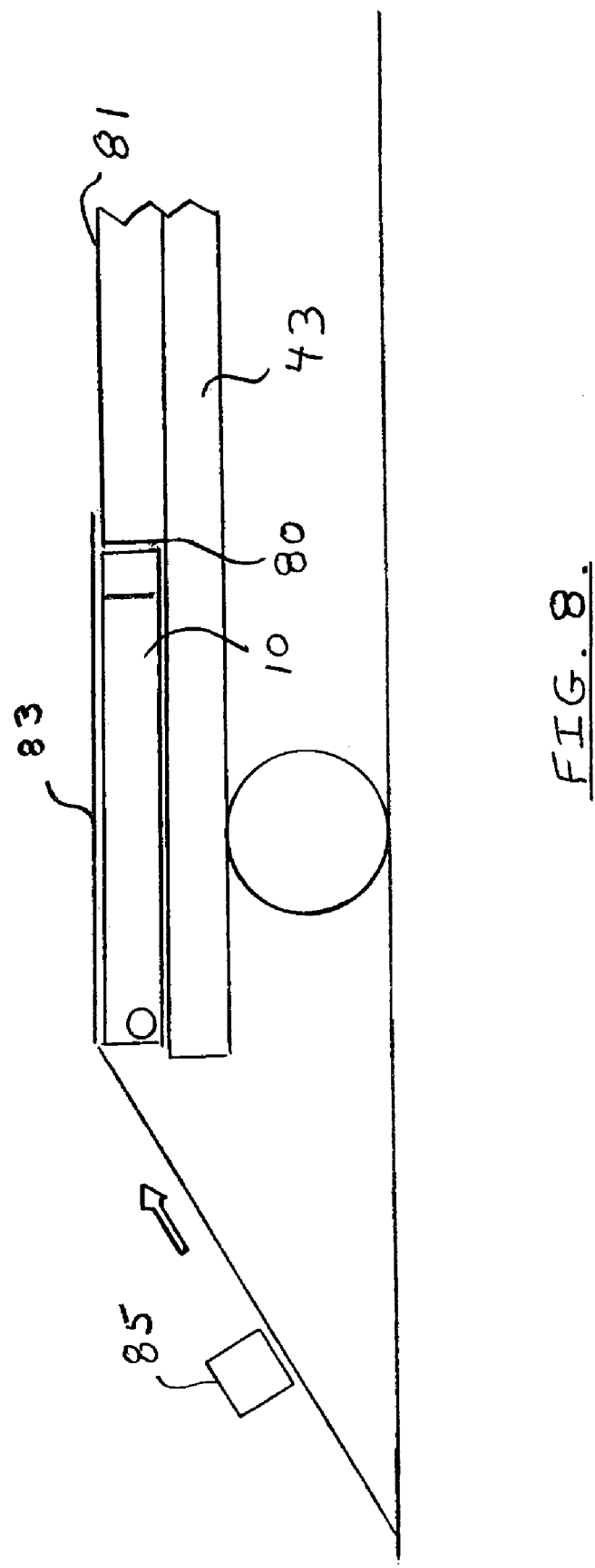

FIG. 8 shows an advantage of the invention whereby the crane can be stored in a horizontal position so a forklift can be readily used to efficiently load products.

FULL DESCRIPTION OF THE PREFERRED EMBODIMENTS

Referring to the drawing figures, FIG. 1a through 1f show a lift,hoist or crane unit 10.

The various components are numbered in FIG. 1c as follows:

a pair of arms 11 and 12 are connected by a cross-arm indicated at numeral 14;
the lower ends of arms 11 and 12 have angled rocker elements 17 and 18;
numerals 21 and 22 indicate lower support and drive elements;
the ends of the drive elements are shown at numerals 23 and 24 as angled to receive the angled upper rocker elements;
a winch unit is shown at numeral 16.

The winch unit 16 is utilized to pick up a load 29 as indicated in FIG. 1f.

As indicated in the progression of FIGS. 1a through 1f, the upper arms 11, 12 and the cross member 14 are driven through various angles from zero degrees in FIG. 1a to about 135 degrees in FIG. 1f.

Figure 2:
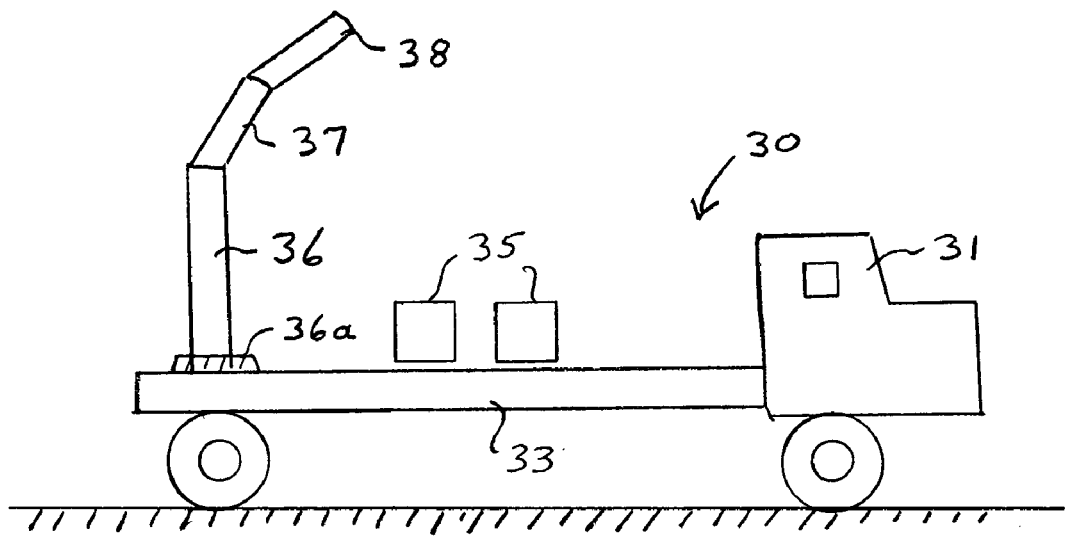
FIG. 2 shows a typical prior art truck crane with a vertical drive element and a high center of gravity.

Referring to the Prior Art drawing of FIG. 2, a typical type of flat-bed truck crane is broadly shown.

The truck 30 has a cab area 31 and an elongated flat bed 33 carrying loads or products to be moved 35.

The crane is mounted at the rear of the flat bed and includes a vertically mounted drive unit 36 which is permanently mounted to the rear of the flat bed by means of mounting/attaching unit 36a.

The crane further includes boom elements 37 and 38.

In the prior art system of FIG. 2, it is important to note that the vertical placement of drive 36 gives the overall crane a relatively high center of gravity. Such results in a tendency to tip at certain points in the load moving process.

The prior art crane of FIG. 2 is thus not moved to other points on the flat bed since it is engineer designed to be located at only a certain point. This aspect of the prior art is a significant problem and is overcome by the present invention as will be described.

Figure 3:
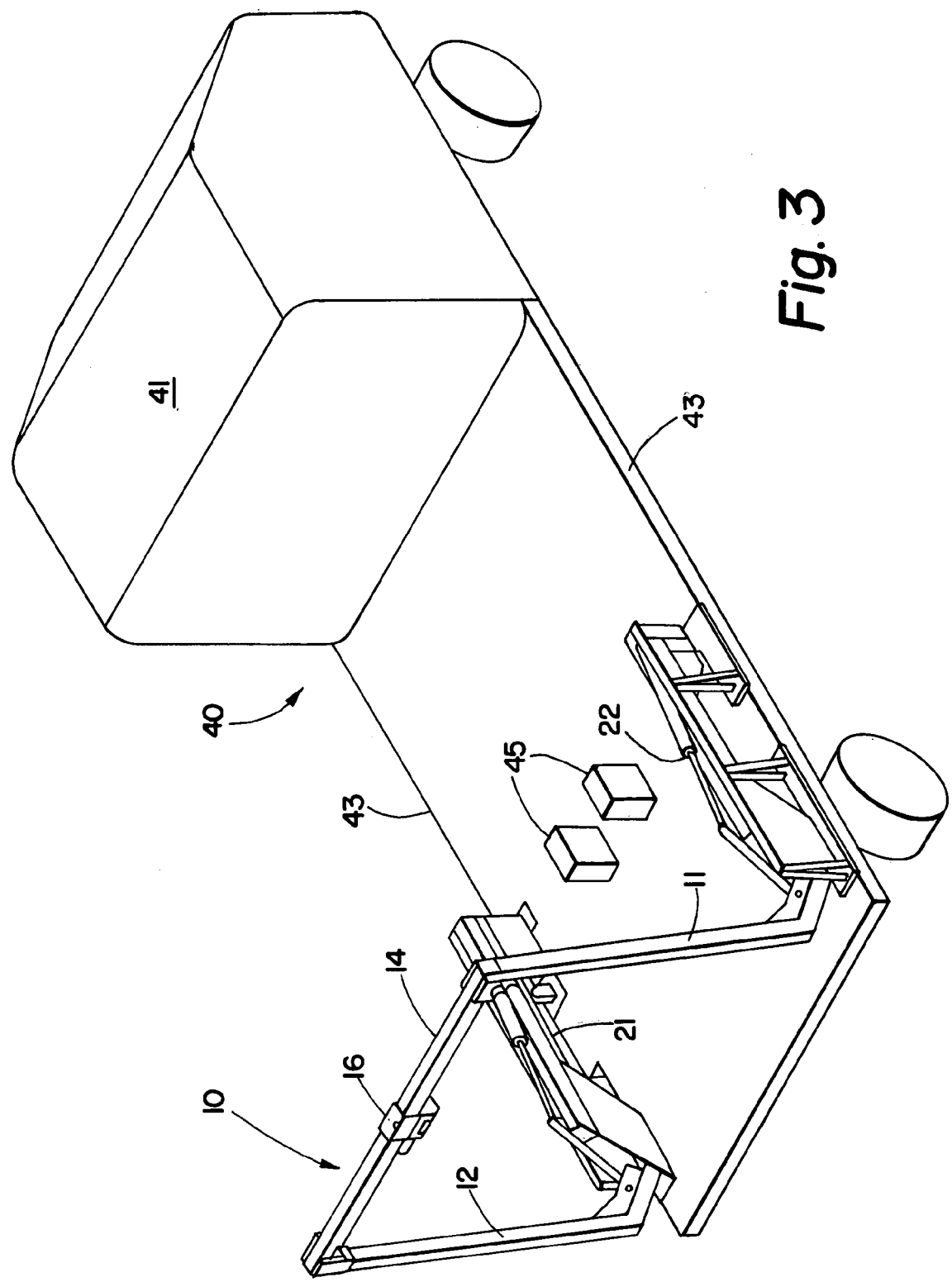
FIG. 3 shows a crane of the invention mounted on the rear of a flat-bed truck.

Referring to an embodiment of the invention shown in FIG. 3, a crane, lift or hoist 10 is shown. Such is of the type previously shown in FIGS. 1a-1f.

FIG. 3 shows a flat-bed truck 40 with cab section 41 and an elongated bed 43.

In this embodiment, the crane 10 is placed at the rear of the bed 43.

Crane 10 has horizontally mounted hydraulic drive elements 21 and 22. It further includes elongated and pivotable arms 11 and 12 and a cross-arm or cross bar 14 having a winch 16 mounted thereon.

The horizontal position of the hydraulic drive elements is important since such lowers the center of gravity of the crane and thus provides for a more stable, i.e. less tendency to tip aspect, transfer and movement of load or products shown at 45. Greater lifting force is also achieved by the more compact design and by the dual drive elements.

The crane or lift 10 is mounted to the bed 43 by means of brackets to be later described.

Figure 4:
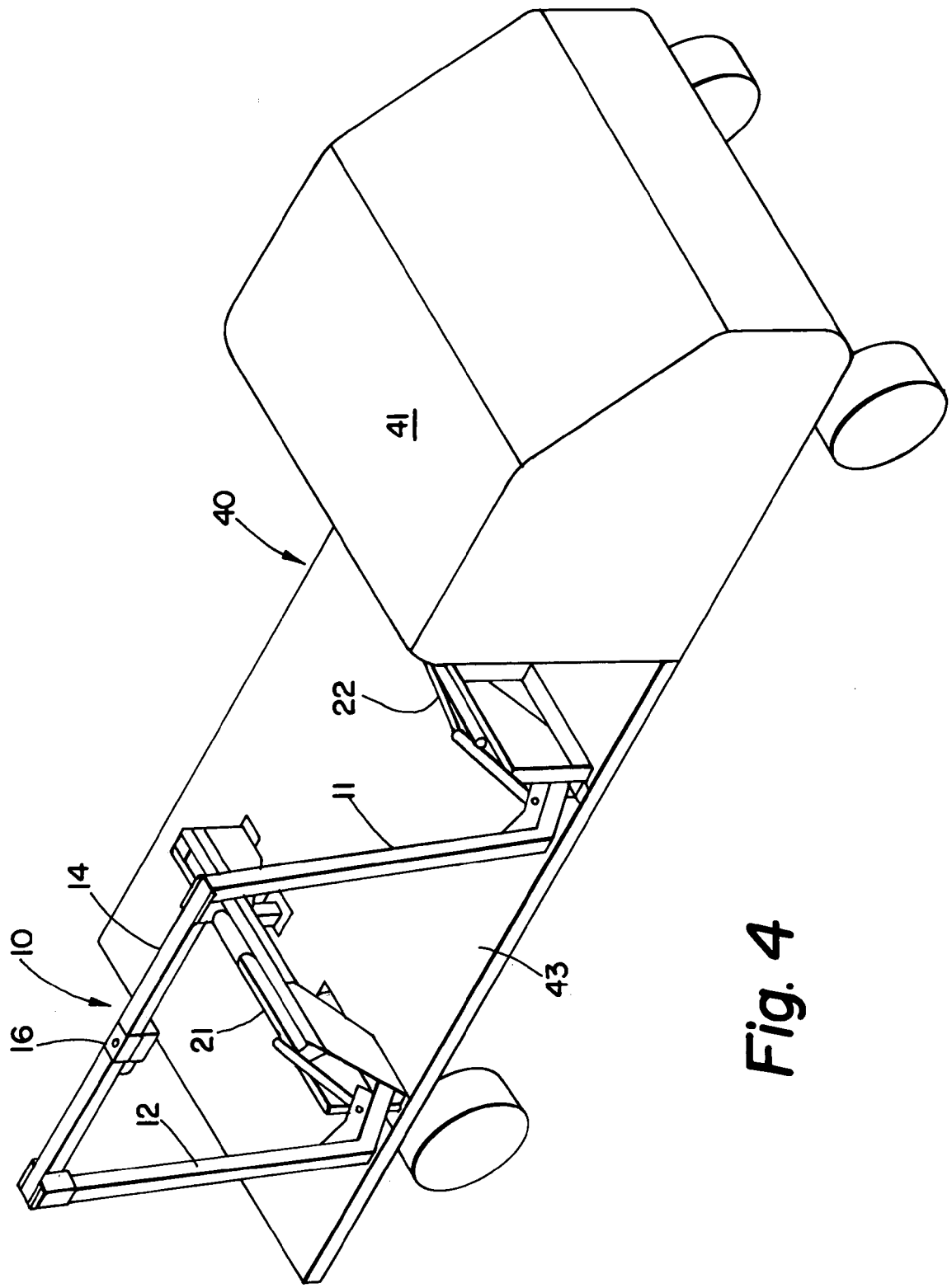
FIG. 4 shows the invention crane mounted on the side of a flat-bed truck.

As shown in FIG. 4, the crane or lift 10 may be mounted at a side position of bed 43.

FIG. 4 again shows the various components as follows: hydraulic horizontally placed drive units 21 and 22, extending arms 11 and 12, and cross-arm or cross bar 14 having a winch 16.

This type of side-mounted crane would have utility, for example, when it is needed or desired to deliver products to a roadside location as a part of road repair or construction.

It is an important aspect of the system/method that the crane of the invention can be moved to various locations around the truck bed. Such is significant since it means that a single flat-bed truck can use various load lifting configurations. Thus, fleet expense is reduced and the fleet owner has a more cost-effective operation.

FIG. 5 shows a schematic sectional view of the lower support and drive elements 21 and 22 as they are mounted to the bed 43 of a flat-bed truck.

The left side lower support and drive element 21 has an outside wall 25. A bracket 60 is utilized to hold the drive element down via bolt 68 or other equivalent attaching means. Bracket 60 includes, for example, a vertical wall 61, an upper horizontal wall 62 and a lower horizontal wall 63.

Similarly, the right side lower support and drive element 22 has an outside wall 26. A bracket 70 is used to hold the drive element down onto bed 43. The right side bracket has a vertical wall 71, an upper horizontal wall 72 and a lower horizontal wall 73. Bolt or other equivalent attaching means 78 are used as a fastener.

The bracket side view of FIG. 6 shows schematically the vertical wall 61, horizontal walls 62 and 63, and attaching means 68 and 68a.

The fact that lower drive elements 21 and 22 rest horizontally along bed 43 allows relatively simpler bracket elements to be utilized.

FIG. 7 illustrates a method of practice of the invention wherein multiple cranes or lifts are utilized on the same flat-bed truck.

A first lift 10a is placed on the rear of the bed 43 to unload products 45a to a point as indicated by the arrow.

A second lift 10b is placed on the side of the bed to unload products 45b to a point as indicated.

Various crane or lift sizes may be used as needed to achieve the most efficient unloading performance. For example, where reduced unloading time is critical, the use of multiple cranes as shown in FIG. 7 achieves the desired rapid unloading.

The method and business method steps involved in practice of the invention may be broadly recited as follows:
a) providing a first crane at a rear portion of a flat-bed truck to unload a first product group,
b) providing a second crane at a side portion of a flat-bed truck to unload a second product group.

One critical advantage of the fold-down type of crane or lift, previously shown in FIG. 1a, is that it may be utilized as shown in FIG. 8.

FIG. 8 shows that the bed 43 of a truck has a portion 80 cut out to accomodate the crane 10. The crane 10 thus lies flush with a top wall 81 of bed 43.

A plate 83 or other equivalent structures may be used to cover crane 10 during loading of products via a forklift truck shown schematically at 85.

This particular type of loading efficiency is not achievable using other types of cranes in the art.

While particular systems and methods of use have been shown and described, it is intended to cover all equivalent systems and methods which would reasonably occur to those of skill in the art.

The invention is further defined by the claims appended hereto.

I claim:

1. A method of loading and unloading a flat-bed truck comprising the steps of:
   a) providing a crane or lift having a first lower hydraulic drive element and a second lower hydraulic drive element which is placed in parallel with said first hydraulic drive element,
   b) providing a first pivoting arm connected to said first lower hydraulic drive element and a second pivoting arm connected to said second lower hydraulic drive element,
   c) providing a cross-arm connected between the first and second pivoting arms,
   d) attaching the first and second lower drive elements in a horizontal position along the bed of the flat-bed truck by use of bracket elements,
   e) moving a load from the flat-bed truck to a delivery point depending upon the particular position of the crane or lift,
   f) providing that said first and second pivoting arms are contained within an area adjacent to the bed of the truck when the crane or lift is in a lowered or inactive position and that, in said lowered position, the crane or lift does not extend beyond the truck bed area,
   g) providing that the cross-arm is permanently attached to said first and second pivoting arms and that the truck bed has a cut out area to receive the cross-arm and the attached first and second pivoting arms,
   h) providing a first complete crane or lift means (10a) as an element of said crane or lift for loading and unloading a rear portion of the flat-bed truck,
   i) providing a second complete crane or lift means (10b) as an element of said crane or lift for loading and unloading a side portion of the flat-bed truck,
   j) providing a cover plate (83) positionable over each crane or lift means to enable a fork-lift to pass thereover when it is in its lowered position.

* * * * *